Feb. 9, 1937.　　O. F. GOTTLIEB　　2,070,429
BUMPER GUARD
Filed Jan. 5, 1935
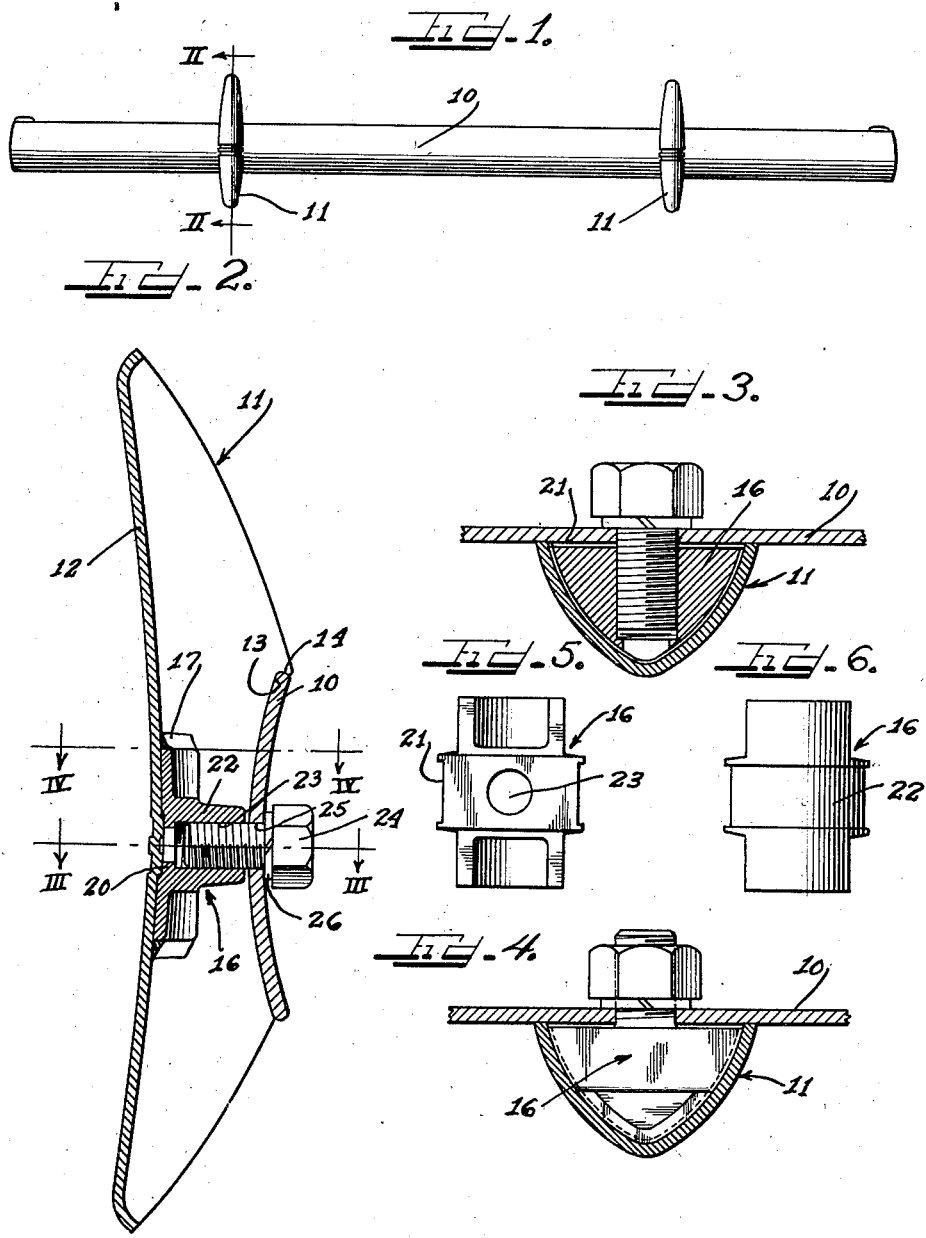
Inventor
Oscar F. Gottlieb Patented Feb. 9, 1937

2,070,429

UNITED STATES PATENT OFFICE 2,070,429

BUMPER GUARD

Oscar F. Gottlieb, Lake Bluff, Ill., assignor to Oakes Products Corporation, North Chicago, Ill., a corporation of Michigan Application January 5, 1935, Serial No. 527

9 Claims. (Cl. 293—55)

This invention relates to a vehicle bumper or fender construction, and more particularly to a protective structure affording a vertical guard member which may be secured to a horizontal bumper member to increase the effective overall height or width of the bumper member.

An object of this invention is to provide an improved and simplified construction for attaching a vertical guard member to a horizontal bumper or fender on an automotive vehicle.

Another object of the invention relates to the provision of means in a guard member for attachment in a vertical position to a horizontal bumper member, whereby the alignment and positioning of the guard member on the bumper member prior to its securement thereto is facilitated.

A still further object of the invention relates to the provision of a guard member of the aforementioned character, with an attaching part adapted to be made an integral component of the guard member by being welded thereto, and which member and part are provided with interfitting male and female portions for facilitating the location of the attaching part in a predetermined position on the rear side of the guard member prior to its securement thereto.

In accordance with the general features of this invention, there is provided a vehicle guard member adapted for attachment in a vertical position to a vehicle bumper member, which guard member includes a part having its rear side recessed, as well as an attaching part disposed in the recess, these two parts having interfitting rib and groove portions for locating the attaching part in a predetermined position with respect to the recessed part prior to its being welded thereto.

Another feature of the invention relates to providing the rear side of the recessed part of the guard member with spaced parallel edges, one on each side of the attaching part, and each being curved to embrace tightly the surface of the bumper member to which the impact member is attached; these edges terminating in hook-like shoulders formed to engage over a top edge of the bumper member for aiding in the positioning of the guard member on the bumper member prior to its being bolted thereto.

Other objects and features of this invention will more fully appear from the following detailed description, taken in connection with the accompanying drawing, which illustrates a single embodiment thereof, and in which:

Figure 1 is a front view of a vehicle impact or bumper and guard construction embodying the features of this invention;

Figure 2 is an enlarged vertical sectional view taken through one of the guard members on the line II—II of Figure 1, and showing clearly my novel bumper guard mechanism;

Figure 3 is a cross-sectional view taken on substantially the line III—III of Figure 2, looking in the direction indicated by the arrows;

Figure 4 is a sectional view taken on substantially the line IV—IV of Figure 2, looking in the direction indicated by the arrows;

Figure 5 is a rear view of the attaching part which is adapted to be welded to the guard member; and Figure 6 is a front view of this same attaching part, showing the groove therein for accommodating a rib or male portion on the rear side of the guard member.

The reference numeral 10 designates generally a vehicle bumper or fender member which is adapted to be secured in any suitable way to an end or side of a vehicle, such as an automobile. This bumper may be of any suitable or desired construction, and, in accordance with the preferred embodiment of my invention, it is illustrated as having a curved cross-sectional shape, as will be evident from Figure 2.

Secured at spaced points to this bumper are a pair of guard members 11 which are identical in construction and which embody the features of this invention. These guard members are adapted to increase the overall height or width of the bumper 10 so as to aid in preventing bumpers or projections on vehicles, other than the one to which the bumper 10 is secured, from riding over the horizontal edges of the bumper bar 10.

The guard member 11 comprises an outer part 12 which may be made of any suitable material, but is preferably blanked from sheet material on suitable punch press equipment. The recessed part 12 has on its rear side a pair of curved parallel edges 13, shaped to conform to the outer transverse curvature of the bumper 10, so as to tightly embrace the same, as shown in Figure 2. The upper end of each of these curved edges 13 terminates in a rearwardly extending shoulder 14 to form a hook-like extension for engaging over the top edge of the bumper bar 10. This construction is advantageous in that it facilitates the positioning of the guard member on the bumper member prior to its being bolted or otherwise secured thereto.

Positioned inside the recess on the rear side of the guard part 12 is a substantially central attaching part 16, the shape and construction of which is fully evident from the separate views, Figures 5 and 6, of this part. This part is adapted to be secured to the rear surface of the outer part 12 by means of a weld along its marginal portions, which weld is designated by the reference numeral 17 in Figure 2. I find that it is advantageous to weld this part to the outer part 12, rather than to secure it by fastening elements, since it eliminates the necessity of having any bolts or rivets projecting through the part 12 and thereby detracting from the appearance of its smooth and highly finished exterior surface.

Prior to the welding of the part 16 to the part 12 of the guard member 11, the part 16 is brought into a predetermined central position in the interior of the part 12. This positioning of the part 16 is effected by means of a rib or male portion 20 formed on the rear side of the part 12 and adapted to extend into a groove or female portion 21 of the attaching part 16. I have illustrated the rib portion 20 as comprising two separate ribs, but it is, of course, to be understood that a single rib may be used in place thereof with equal advantage.

The attaching part 16 has a rearwardly projecting central part 22 which has a threaded aperture 23 into which the threaded end of a bolt or cap screw 24 is adapted to be screwed. This cap screw 24 is positioned with its head to the rear of the bumper member 10 and with its threaded shank extending through an aperture 25 in the bumper member 10 adapted to be aligned with the threaded aperture 23 in the part 22 of part 16. A lock washer 26 may be disposed between the head of the bolt and the rear surface of the bumper member 10, if the same is desired.

From the foregoing, it will be evident that I have provided concealed means for attaching a vertical guard member to a horizontal bumper, which concealed means is advantageous in that it precludes the necessity of having any fastening means project through the outer part 12 of the guard member. Thus, this construction not only provides a simplified device for detachably fastening the guard member in position, but in addition thereto enables the exterior appearance of the guard and bumper members to be enhanced.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. As an article of manufacture, a vehicle guard member adapted for attachment in a vertical position to a vehicle bumper member, said guard member comprising a part having its rear side recessed and an attaching part disposed in the recess of the first part, and being welded to the recessed part so as to be integral therewith, one of said parts having a male portion and the other part having a female portion interfitting with said male portion for locating the attaching part in a predetermined position with respect to the recessed part independently of the bumper member and prior to its being welded thereto.

2. As an article of manufacture, a vehicle guard member adapted for attachment in a vertical position to a vehicle bumper member, comprising a part having its rear side recessed and an attaching part disposed in the recess of the first part, and being secured to the recessed part so as to be integral therewith, said parts having interfitting portions for locating the attaching part in a predetermined position with respect to the recessed part prior to its securement thereto, said rear side of the recessed part having spaced parallel edges, one on each side of the attaching part, and each edge being curved so as to be adapted to embrace tightly the surface of the bumper member to which the guard member is attached.

3. As an article of manufacture, a vehicle guard member adapted for attachment in a vertical position to a vehicle bumper member, comprising a part having its rear side recessed and an attaching part disposed in the recess of the first part, and being secured to the recessed part so as to be integral therewith, said parts having interfitting portions for locating the attaching part in a predetermined position with respect to the recessed part prior to its securement thereto, said interfitting portions having nesting surfaces, one of which has a rib and the other of which has a groove for accommodating said rib.

4. As an article of manufacture, a vehicle guard member adapted for attachment in a vertical position to a vehicle bumper member, comprising a part having its rear side recessed and an attaching part disposed in the recess of the first part, and being secured to the recessed part so as to be integral therewith, said parts having interfitting portions for locating the attaching part in a predetermined position with respect to the recessed part prior to its securement thereto, said rear side of the recessed part having spaced parallel edges, one on each side of the attaching part, and each edge being curved so as to be adapted to embrace tightly the surface of the bumper member to which the guard member is attached, said edges being parallel and terminating in hook-like shoulders adapted to engage over a top edge of the bumper member for aiding in positioning of the guard member on the bumper member prior to its securement thereto.

5. As an article of manufacture, a vehicle guard member adapted for attachment in a vertical position to a vehicle bumper member comprising a part having its rear side recessed and an attaching part disposed in the recess of the first part, and being welded to the recessed part so as to be integral therewith, said parts having interfitting portions for locating the attaching part in a predetermined position with respect to the recessed part prior to its being welded thereto, said attaching part having its marginal portions welded to the rear surface of the recessed part, and said attaching part also including a rearwardly projecting intermediate portion having a threaded aperture for the accommodation of attaching means, such as a bolt or the like.

6. In combination, a vehicle guard member, a vehicle bumper member to which the guard member is adapted to be secured in a vertical position, and attaching means for securing said members together, said guard member comprising a part having its rear side recessed and an attaching part disposed in the recess of the first part and integrally secured thereto, and said attaching means including bolt means extending through an aperture in the vehicle bumper member for cooperation with said attaching part of the guard member, said parts of the guard member having interfitting male and female portions for locating the attaching part in a predetermined position with respect to the recessed part prior to its securement thereto.

7. As an article of manufacture, a vehicle guard member adapted for attachment in a vertical position to a vehicle bumper member, comprising a part having its rear side recessed and an attaching part disposed in the recess of the first part, and being welded to the recessed part so as to be integral therewith, one of said parts having a male portion and the other part having a female portion interfitting with said male portion for locating the attaching part in a predetermined position with respect to the recessed part preparatory to its being welded thereto, the weld between said parts being around the edge of said attaching part and between said edge and a rear surface of said recessed part.

8. As an article of manufacture, a vehicle guard member adapted for attachment in a vertical position to a vehicle bumper member, said guard member comprising a part having its rear side recessed and an attaching part disposed in the recess of the first part, and being welded to the recessed part so as to be integral therewith, said parts having interfitting portions for locating the attaching part in a predetermined position with respect to the recessed part prior to their being welded together, said attaching part being marginally welded to the rear surface of the recessed part, and said attaching part also including a rearwardly projecting intermediate portion threaded for the accommodation of threaded attaching means.

9. As an article of manufacture, a vehicle guard member adapted for attachment in a vertical position to a vehicle bumper member, said guard member comprising a part having its rear side recessed and an attaching part disposed in the recess of the first part and arranged so that when the guard member is attached to the bumper member, both of said parts are on the same side of the bumper member, said attaching part being welded to the recessed part so as to be integral therewith, one of said parts having a male portion and the other part having a female portion interfitting with said male portion for locating the attaching part in a predetermined position with respect to the recessed part prior to its being welded thereto.

OSCAR F. GOTTLIEB.